3,072,718
Patented Jan. 8, 1963

3,072,718
METHOD FOR PREPARING UNSYMMETRICAL BORAZOLES
Herbert C. Newsom, Whittier, William G. Woods, Anaheim, and Allen L. McCloskey, Orange, Calif., assignors to United States Borax & Chemical Corporation, Los Angeles, Calif., a corporation of Nevada
No Drawing. Filed May 12, 1961, Ser. No. 109,503
9 Claims. (Cl. 260—551)

The present invention relates as indicated to a method for preparing unsymmetrical borazoles.

The unsymmetrical borazoles of the present invention are heterocyclic hexatomic ring compounds in which either one or two of the boron atoms of the borazole ring are bonded to hydrogen while the other atoms of the ring are bonded to either alkyl or phenyl radicals. Unsymmetrical borazoles having two boron atoms bonded to hydrogen and the other atoms of the ring bonded to the alkyl or phenyl radicals are called difunctional borazoles. The unsymmetrical borazoles having one boron atom bonded to hydrogen and the other boron and nitrogen atoms bonded to the alkyl or phenyl radicals are called monofunctional borazoles.

The hydrogen-substituted atoms of the unsymmetrical borazole ring are more reactive than the other atoms of the ring having alkyl or phenyl substituents. The difunctional borazoles having two sites on the ring which are more reactive than the other sites on the borazole ring provide a means for preparing high molecular weight, linked-borazole chain polymers, and the monofunctional borazoles having one site on the borazole ring which is more reactive than the other sites on the ring provide a means for preparing other monofunction borazole derivatives.

Polymerization and other chemical studies of the unsymmetrical borazoles have been limited due to the unavailability of substantially pure compounds. The prior methods for preparing the unsymmetrical borazoles have been very time consuming and expensive, and they result in unpredictable yields of products which are extremely difficult to purify. Further, such methods are only suitable for small scale preparations of the unsymmetrical borazoles.

It is, therefore, the principal object of this invention to provide an efficient and economically desirable method for preparing substantially pure unsymmetrical borazoles.

Other objects of the present invention will appear as the description proceeds.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

Broadly stated the present invention comprises the method for preparing unsymmetrical borazoles having the formulae:

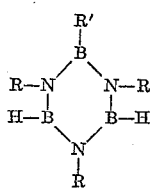

and

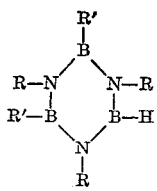

which comprises reacting a substituted borazole having the formula $(HBNR)_3$ with a substituted borazole having the formula $(R'BNR)_3$ in a closed system at a temperature of from about 170° C. to about 400° C.; separating the resultant reaction mass by distillation and recovering substantially pure unsymmetrical borazoles; where R and R' are materials selected from the group consisting of alkyl radicals of from 1 to 6 carbon atoms and phenyl and R is the same in both reactants.

The reaction of the foregoing broadly stated paragraph can best be illustrated by the following equation:

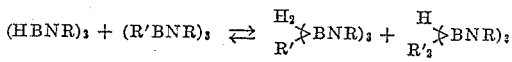

where R and R' are either alkyl radicals of from 1 to 6 carbon atoms or phenyl and R is the same in both reactants. This is an equilibrium reaction and the resultant reaction mass comprises a mixture of the desired products and the reactants, all of which are readily separated one from the other by distillation and are recovered in a substantially pure state.

The unsymmetrical borazoles can be prepared by the present process regardless of the molar ratio of the reactants present. However, we have found that by varying the molar ratio of the reactants the concentration of the products at equilibrium will vary and that the molar ratio of the reactants also determines which of the unsymmetrical borazole products will be present in the greater amount at equilibrium. When the molar ratio of reactants, $(HBNR)_3$ and $(R'BNR)_3$, is about 2 to 1 the reaction mass contains about 58 to 60% difunctional borazole, 20 to 25% monofunctional borazole, and 15 to 22% reactants at equilibrium, and when the molar ratio is about 1 to 2 the reaction mass contains about 58 to 60% monofunctional borazole, 20 to 25% difunctional borazole, and 15 to 22% reactants at equilibrium. These figures are indicative of the highest concentrations of products which can be attained at equilibrium and in the preferred embodiment of the invention we use the reactants, $(HBNR)_3$ and $(R'BNR)_3$ in about a 2 to 1 or about a 1 to 2 molar ratio depending on which of the unsymmetrical borazoles is desired in the largest quantity.

The reaction temperature determines the time required for the reaction to reach equilibrium, and to some extent is controlling on the yield of desired product. The reaction rate is too slow for any practical applications when the reaction temperature is below about 170° C., and above about 400° C. the borazoles tend to decompose rapidly and the yield of product is consequently lowered. In the preferred embodiment of the invention the reactions are conducted at temperatures of from about 250° C. to about 350° C.

The following list is illustrative of the substituted borazoles applicable as reactants to the present invention.

$(HBNR)_3$:
    N-trimethylborazole
    N-triethylborazole
    N-triisopropylborazole
    N-tri-t-butylborazole N-tri-n-hexylborazole
N-triphenylborazole (R'BNR)₃:
 Hexamethylborazole
 Hexaethylborazole
 Hexapropylborazole
 Hexaphenylborazole
 B-trimethyl-N-triphenylborazole
 B-triethyl-N-tri-t-butylborazole
 B-tripropyl-N-trimethylborazole It is to be clearly understood that the foregoing list is only a partial enumeration of the substituted borazoles applicable to the present invention and is not intended to limit the invention.

So that the present invention can be more clearly understood, the following examples are given for illustrative purposes:

I

A mixture comprising 12.25 grams (0.10 mole) of N-trimethylborazole and 8.22 grams (0.050 mole) of hexamethylborazole was sealed in an evacuated ampoule and heated at 250° C. for 96 hours. The reaction mass was then cooled and removed from the ampoule and placed in a distillation apparatus. The reaction mass was distilled to yield 11.01 grams (53.8%) of B-methyl-N-trimethylborazole and 4.75 grams (23.2%) B-dimethyl-N-trimethylborazole. Chemical analysis of these compounds yielded the following data:

Calculated for

B=23.81%, C=35.16%, H=10.26%, N=30.77.
Found in product: B=23.77%, C=35.23%, H=10.33%, N=30.67%.

Calculated for

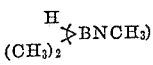

B=21.59%, C=39.87%, H=16.63%, N=27.91%.
Found in product: B=21.61%, C=39.84%, H=10.60%, N=27.95%.

Gas chromatography showed the compounds to be about 98.1% and 97.8% pure, respectively.

II

A mixture comprising 12.25 grams (0.10 mole) of N-trimethylborazole and 8.22 grams (0.050 mole) of hexamethylborazole was sealed in an evacuated ampoule and heated at 350° C. for 11 hours. The reaction mass was then cooled and removed from the ampoule and placed in a distillation apparatus. The reaction mass was distilled to yield 10.66 grams (52.1%) B-methyl-N-trimethylborazole and 4.85% grams (23.7%) B-dimethyl-N-trimethylborazole. Chemical analysis of these compounds yielded the following data:

Calculated for

B=23.81%, C=35.16%, H=10.26%, N=30.77%.
Found in product: B=23.69%, C=35.39%, H=10.35%, N=30.57%.

Calculated for

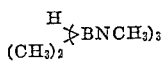

B=21.59%, C=39.87%, H=10.63%, N=27.91%.
Found in product: B=21.73%, C=39.70%, H=10.55%, N=28.02%.

Gas chromatography showed the compounds to be about 97.4% and 98.3% pure, respectively.

III

A mixture comprising 4.90 grams (0.040 mole) of N-trimethylborazole and 13.17 grams (0.80 mole) of hexamethylborazole was sealed in an evacuated ampoule and heated for 12 hours at 350° C. The reaction mass was then cooled and removed from the ampoule and placed in a distillation apparatus. The reaction mass was distilled to yield 4.23 grams (23.4%) B-methyl-N-trimethylborazole and 9.79 grams (54.2%) B-dimethyl-N-trimethylborazole. Chemical analysis of these compounds yielded the following data:

Calculated for

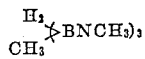

B=23.81%, C=35.16%, H=10.26%, N=30.77%.
Found in product: B=23.67%, C=35.33%, H=10.32%, N=30.68%.

Calculated for

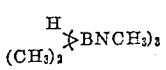

B=21.59%, C=39.87%, H=10.63%, N=27.91%.
Found in product: B=21.53%, C=39.95%, H=10.67%, N=27.85%.

Gas chromatography showed the compounds to be about 97.7% and 97.3% pure, respectively.

IV

A mixture comprising 12.39 grams (0.060 mole) of N-triisopropylborazole and 9.98 grams (0.030 mole) of hexaisopropylborazole was sealed in an evacuated ampoule and heated for 36 hours at 300° C. The reaction was then cooled and removed from the ampoule and placed in a distillation apparatus. The reaction mass was distilled to yield 11.77 grams (52.6%) B-isopropyl-N-triisopropylborazole and 5.03 grams (22.5%) B-diisopropyl-N-triisopropylborazole. Chemical analysis of these compounds yielded the following data:

Calculated for

B=13.08%, C=57.95%, H=12.07%, N=16.90%.
Found in product: B=12.87%, C=58.17%, H=12.24%, N=16.72%.

Calculated for

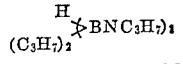

B=11.19%, C=61.96%, H=12.39%, N=14.46%.
Found in product: B=11.30%, C=61.76%, H=12.29%, N=14.65%.

Gas chromatography showed the compounds to be about 97.5% and 98.5% pure, respectively.

V

A mixture comprising 12.39 grams (0.060 mole) of N-triisopropylborazole and 9.98 grams (0.030 mole) of hexaisopropylborazole was sealed in an evacuated ampoule and heated for 16 hours at 350° C. The reaction mass was then cooled and removed from the ampoule and placed in a distillation apparatus. The reaction mass was distilled to yield 12.30 grams (55.0%) B-isopropyl-N-triisopropylborazole and 5.39 grams (24.1%) B-diisopropyl-N-triisopropylborazole. Chemical analysis of these compounds yielded the following data:

Calculated for

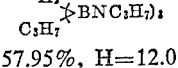

B=13.08%, C=57.95%, H=12.07%, N=16.90%.
Found in product: B=13.02%, C=58.07%, H=12.12%, N=16.79%.

Calculated for

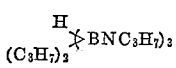

B=11.19%, C=61.96%, H=12.39%, N=14.46%.
Found in product: B=11.26%, C=61.85%, H=12.34%, N=14.55%.

Gas chromatography showed the compounds to be about 98.3% and 97.7% pure, respectively.

VI

A mixture comprising 5.16 grams (0.025 mole) of N-triisopropylborazole and 16.62 grams (0.050 mole) of hexaisopropylborazole was sealed in an evacuated ampoule and heated for 14 hours at 350° C. The reaction mass was then cooled and removed from the ampoule and placed in a distillation apparatus. The reaction mass was then distilled to yield 4.55 grams (20.9%) B-isopropyl-N-triisopropylborazole and 11.28 grams (51.8%) B-diisopropyl-N-triisopropylborazole. Chemical analysis of these compounds yielded the following data:

Calculated for

B=13.08%, C=57.95%, H=12.07%, N=16.90%.
Found in product: B=12.91%, C=58.21%, H=12.15%, N=16.73%.

Calculated for

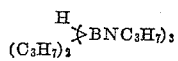

B=11.19%, C=61.96%, H=12.39%, N=14.46%.
Found in product: B=11.36%, C=61.66%, H=12.29%, N=14.69%.

Gas chromatography showed the compounds to be about 97.2% and 98.0% pure, respectively.

VII

A mixture comprising 13.16 grams (0.080 mole) of N-triethylborazole and 8.26 grams (0.040 mole) of B-trimethyl-N-triethylborazole was sealed in an evacuated ampoule and heated at 350° C. for 10 hours. The reaction mass was then cooled and transferred to a distillation apparatus. The reaction mass was distilled to yield 11.72 grams (54.7%) B-methyl-N-triethylborazole and 4.84 grams (22.6%) B-dimethyl-N-triethylborazole. Chemical analysis of these compounds yielded the following data:

Calculated for

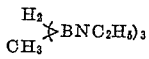

B=18.21%, C=47.06%, H=11.20%, N=23.53%.
Found in product: B=18.16%, C=47.15%, H=11.23%, N=23.46%.

Calculated for

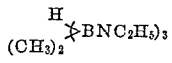

B=16.88%, C=49.87%, H=11.43%, N=21.82%.
Found in product: B=16.94%, C=49.75%, H=11.38%, N=21.93%.

Gas chromatography showed the compounds to be about 98.7% and 98.1% pure, respectively.

VIII

A mixture comprising 6.58 (0.040 mole) of N-triethylborazole and 16.52 grams (0.080 mole) of B-trimethyl-N-triethylborazole was sealed in an evacuated ampoule and heated for about 10 hours at 350° C. The reaction mass was then cooled and removed from the ampoule and transferred to a distillation apparatus. The reaction mass was distilled to yield 5.17 grams (22.4%) B-methyl-N-triethylborazole and 12.73 grams (55.1%) B-dimethyl-N-triethylborazole. Chemical analysis of these compounds yielded the following results:

Calculated for

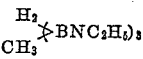

B=18.21%, C=47.06%, H=11.20%, N=23.53%.
Found in product: B=18.14%, C=47.19%, H=11.24, N=23.43%.

Calculated for

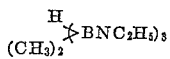

B=16.88%, C=49.87%, H=11.43%, N=21.82%.
Found in product: B=16.97%, C=49.68%, H=11.36%, N=21.99%.

Gas chromatography showed the compounds to be about 98.4% and 97.6% pure, respectively.

From the foregoing examples it will be seen that by reversing the molar ratio of the reactants the yields of products are also reversed.

Other modes of applying the principle of the invention may be employed, change being made as regards the details described, provided the features as stated in any of the following claims or the equivalent of such be employed.

We, therefore, particularly point out and distinctly claim as our invention:

1. The method for preparing unsymmetrical borazoles having the formulae:

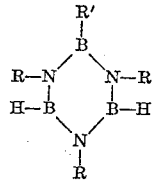

and

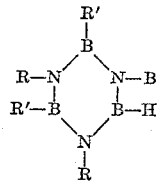

which consists essentially of reacting a substituted borazole having the formula

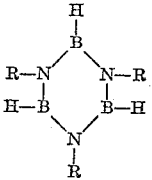

with a substituted borazole having the formula

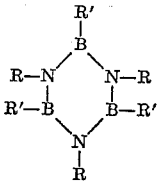

in a closed system at a temperature of from about 170° to about 400° C., separating the resultant reaction mass by distillation and recovering substantially pure unsymmetrical borazoles; where R and R' are materials selected from the group consisting of alkyl radicals of from 1 to 6 carbon atoms and phenyl and R is the same for both reactants.

2. The method for preparing unsymmetrical borazoles having the formulae:

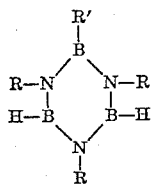

and

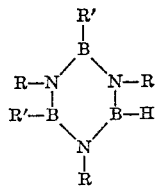

which consists essentially of reacting a substituted borazole having the formula

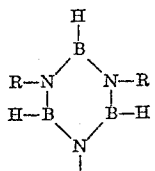

with a substituted borazole having the formula

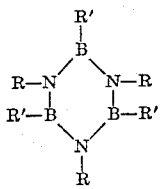

in about a 2 to 1 molar ratio, in a closed system at a temperature of from about 250° C. to about 350° C., separating the resultant reaction mass by distillation and recovering substantially pure unsymmetrical borazoles; where R and R' are materials selected from the group consisting of alkyl radicals of from 1 to 6 carbon atoms and phenyl and R is the same for both reactants.

3. The method for preparing unsymmetrical borazoles having the formulae:

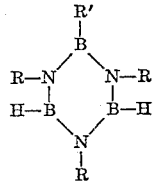

and

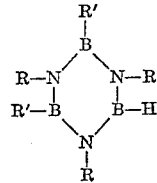

which consists essentially of reacting a substituted borazole having the formula

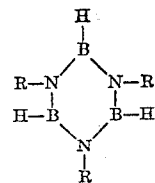

with a substituted borazole having the formula

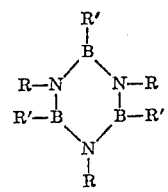

in about a 1 to 2 molar ratio, in a closed system at a temperature of from about 250° C. to about 350° C., separating the resultant reaction mass by distillation and recovering substantially pure unsymmetrical borazoles; where R and R' are materials selected from the group consisting of alkyl radicals of from 1 to 6 carbon atoms and phenyl and R is the same for both reactants.

4. The method for preparing B-methyl-N-trimethyl-borazole and B-dimethyl-N-trimethylborazole which consists essentially of reacting N-trimethylborazole and hexamethylborazole in about a 2 to 1 molar ratio in a closed system at a temperature of from about 250° C. to about 350° C., separating the resultant reaction mass by distillation and recovering substantially pure B-meth-N-trimethylborazole and B-dimethyl-N-trimethylborazole.

5. The method of claim 4 wherein said N-trimethyl-borazole and said hexamethylborazole are present in about a 1 to 2 molar ratio.

6. The method for preparing B-isopropyl-N-triiso-propylborazole and B-diisopropyl-N-triisopropylborazole which consists essentially of reacting N-triisopropyl-borazole and hexaisopropylborazole in about a 2 to 1 molar ratio in a closed system at a temperature of from about 250° C. to about 350° C., separating the resultant reaction mass by distillation and recovering substantially pure B-isopropyl-N-triisopropylborazole and B-diiso-propyl-N-triisopropylborazole.

7. The method of claim 6 wherein said N-triisopropyl-borazole and said hexaisopropylborazole are present in about a 1 to 2 molar ratio.

8. The method for preparing B-methyl-N-triethyl-borazole and B-dimethyl-N-triethylborozole which consists essentially of reacting N-triethylborazole and B-tri-methyl-N-triethylborazole in about a 2 to 1 molar ratio in a closed system at a temperature of from about 250° C. to about 350° C., separating the resultant reaction mass by distillation and recovering substantially pure B-methyl-N-triethylborazole and B-dimethyl-N-triethylborazole.

9. The method of claim 8 wherein said N-triethylbora-zole and said B-trimethyl-N-triethylborazole are present in about a 1 to 2 molar ratio.

No references cited.

UNITED STATES PATENT OFFICE
CERTIFICATE OF CORRECTION

Patent No. 3,072,718                          January 8, 1963

Herbert C. Newsom et al.

It is hereby certified that error appears in the above numbered patent requiring correction and that the said Letters Patent should read as corrected below.

Column 1, line 34, for "monofunction" read -- monofunctional --; column 3, line 41, for "H=16.63%" read -- H=10.63% --; line 42, for "H=10,60%" read -- H=10.60% --; line 56, after "4.85" strike out "%"; column 4, line 34, after "reaction" insert -- mass --; column 6, lines 42 to 49, the formula should appear as shown below instead of as in the patent:

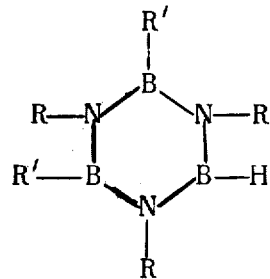

column 8, line 37, for "B-meth-" read -- B-methyl- --; line 55, for "B-dimethyl-N-triethylborozole" read -- B-dimethyl-N-triethylborazole --.

Signed and sealed this 2nd day of July 1963.

(SEAL)
Attest:

ERNEST W. SWIDER                             DAVID L. LADD
Attesting Officer                            Commissioner of
                                                                   Patents